United States Patent [19]

Matthews

[11] 4,380,903
[45] Apr. 26, 1983

[54] ENTHALPY RESTORATION IN GEOTHERMAL ENERGY PROCESSING SYSTEM

[75] Inventor: Hugh B. Matthews, Boylston, Mass.

[73] Assignee: Sperry Corporation, New York, N.Y.

[21] Appl. No.: 247,434

[22] Filed: Mar. 25, 1981

[51] Int. Cl.³ ............................................. F03G 7/00
[52] U.S. Cl. .................................... 60/641.4; 60/688; 60/693; 55/50
[58] Field of Search ...................... 60/641.4, 688, 693; 55/48, 50, 51, 159, 199

[56] References Cited

U.S. PATENT DOCUMENTS

| | | | |
|---|---|---|---|
| 2,078,288 | 4/1937 | Sherman | 55/50 |
| 3,731,488 | 5/1973 | Sasakura et al. | 60/693 |
| 3,824,793 | 7/1974 | Matthews | 60/641.4 |
| 4,059,959 | 11/1977 | Matthews | 60/641.4 |

*Primary Examiner*—A. Michael Chambers
*Attorney, Agent, or Firm*—Howard P. Terry

[57] ABSTRACT

A geothermal deep well energy extraction system is provided of the general type in which solute-bearing hot water is pumped to the earth's surface from a relatively low temperature geothermal source by transferring thermal energy from the hot water to a working fluid for driving a primary turbine-motor and a primary electrical generator at the earth's surface. The superheated expanded exhaust from the primary turbine motor is conducted to a bubble tank where it bubbles through a layer of sub-cooled working fluid that has been condensed. The superheat and latent heat from the expanded exhaust of the turbine transfers thermal energy to the sub-cooled condensate. The desuperheated exhaust is then conducted to the condenser where it is condensed and sub-cooled, whereupon it is conducted back to the bubble tank via a barometric storage tank. The novel condensing process of this invention makes it possible to exploit geothermal sources which might otherwise be non-exploitable.

9 Claims, 3 Drawing Figures

ENTHALPY RESTORATION IN GEOTHERMAL ENERGY PROCESSING SYSTEM

BACKGROUND OF THE INVENTION

1. Field of the Invention

The invention relates generally to efficient means for the generation of electrical or other power by utilizing energy from subterranean geothermal sources and, more particularly, relates to arrangements in which enthalpy losses caused by pressure losses and sub-cooling in the condenser system are restored by passing the expanding down-well turbine exhaust through the condensate liquid feeding the primary or surface heat exchanger.

2. Description of the Prior Art

Generally related prior art geothermal power generation systems have been discussed in recent U.S. patents assigned to Sperry Corporation including:

- H. B. Matthews—U.S. Pat. No. 3,824,793 for "Geothermal Energy System and Method," issued July 23, 1974;
- H. B. Matthews—U.S. Pat. No. 3,989,020 for "Geothermal Energy System and Method" issued Aug. 5, 1975;
- R. Govindarajan, J. L. Lobach, K. E. Nichols—U.S. Pat. No. 3,905,196 for "Geothermal Energy Pump Thrust Balance Apparatus," issued Sept. 16, 1975;
- J. L. Lobach—U.S. Pat. No. 3,908,380 for "Geothermal Energy Turbine and Well System," issued Sept. 30, 1975;
- H. B. Matthews—U.S. Pat. No. 3,910,050 for "Geothermal Energy System and Control Apparatus," issued Oct. 7, 1975;
- H. B. Matthews—U.S. Pat. No. 3,939,334 for "Geothermal Energy Control System and Method," issued Feb. 17, 1976;
- H. B. Matthews—U.S. Pat. No. 3,939,659 for "Geothermal Energy System Fluid Filter and Control Apparatus," issued Feb. 24, 1976; and
- K. E. Nichols—U.S. Pat. No. 3,961,866 for "Geothermal Energy System Heat Exchanger and Control Apparatus," issued June 8, 1976.

Systems of the listed patents may be improved by use of the present invention and will be further discussed in the present specification. In general, they comprise geothermal energy recovery systems making use of thermal energy stored by subterranean heat sources in hot, solute-bearing well water to generate super-heated vapor from a surface-injected flow of a clean liquid; the super-heated vapor is then used to operate a turbine-driven pump within the well for pumping the hot brine at high pressure and always in liquid state to the earth's surface, where it transfers its heat in a binary closed-loop, heat-exchanger turbine-alternator combination for generation of electrical power. Residual brine is pumped back into the earth, while the clean, cooled liquid is regenerated at the surface-located system and is returned to the deep well pumping system for generating vapor and also may be used for lubrication of fluid bearings supporting the turbine-driven pump system.

More recently, H. B. Matthews introduced an additional type of geothermal energy extraction concept in his U.S. Pat. No. 4,142,108, issued Feb. 20, 1979 for a "Geothermal Energy Conversion System" in which the present invention may also be advantageously employed. In the latter Sperry Corporation patent, Matthews describes a gravity head geothermal energy recovery system of improved efficiency again making use of thermal energy stored in hot, solute-bearing well water as it is pumped upward to the earth's surface, now through an extended heat exchange element for continuously heating a downward flowing organic working fluid to a supercritical state. Some of the energy of the latter fluid is used within the well for operating a turbine-driven pump for pumping the hot, solute-bearing well water at high pressure and in liquid state to the earth's surface, where it is finally reinjected into the earth in another well. The temperature difference between the upward flowing brine and the downward flowing organic working fluid is maintained finite in a predetermined manner along the subterranean extended heat exchange element. After driving the deep-well turbine-driven pump, the organic fluid arises to the earth's surface in a thermally insulated conduit; at the earth's surface, vapor turbine electrical power generation equipment is driven by the ascending organic fluid, after which it is returned into the well for reheating in the extended heat exchanger. The use of an organic working fluid in the gravity head well system achieves efficient low-temperature operation in wells wherein the brine reaches only moderate temperature and this operation is further improved according to the present invention.

SUMMARY OF THE INVENTION

The present invention is an improved geothermal energy extraction system that recovers thermal energy stored in hot solute-bearing well water to generate a fluid from an injected flow of working fluid. The fluid is used to drive a turbine-driven pump near the geothermal well bottom for pumping the hot brine, always in liquid state, toward the earth's surface. Energy for the generation of electrical power is extracted from the flowing brine. Enthalpy is restored by passing the expanding power turbine exhaust through the condensate liquid feeding the primary or surface heat exchanger.

DESCRIPTION OF THE PREFERRED EMBODIMENTS

Figure 1:
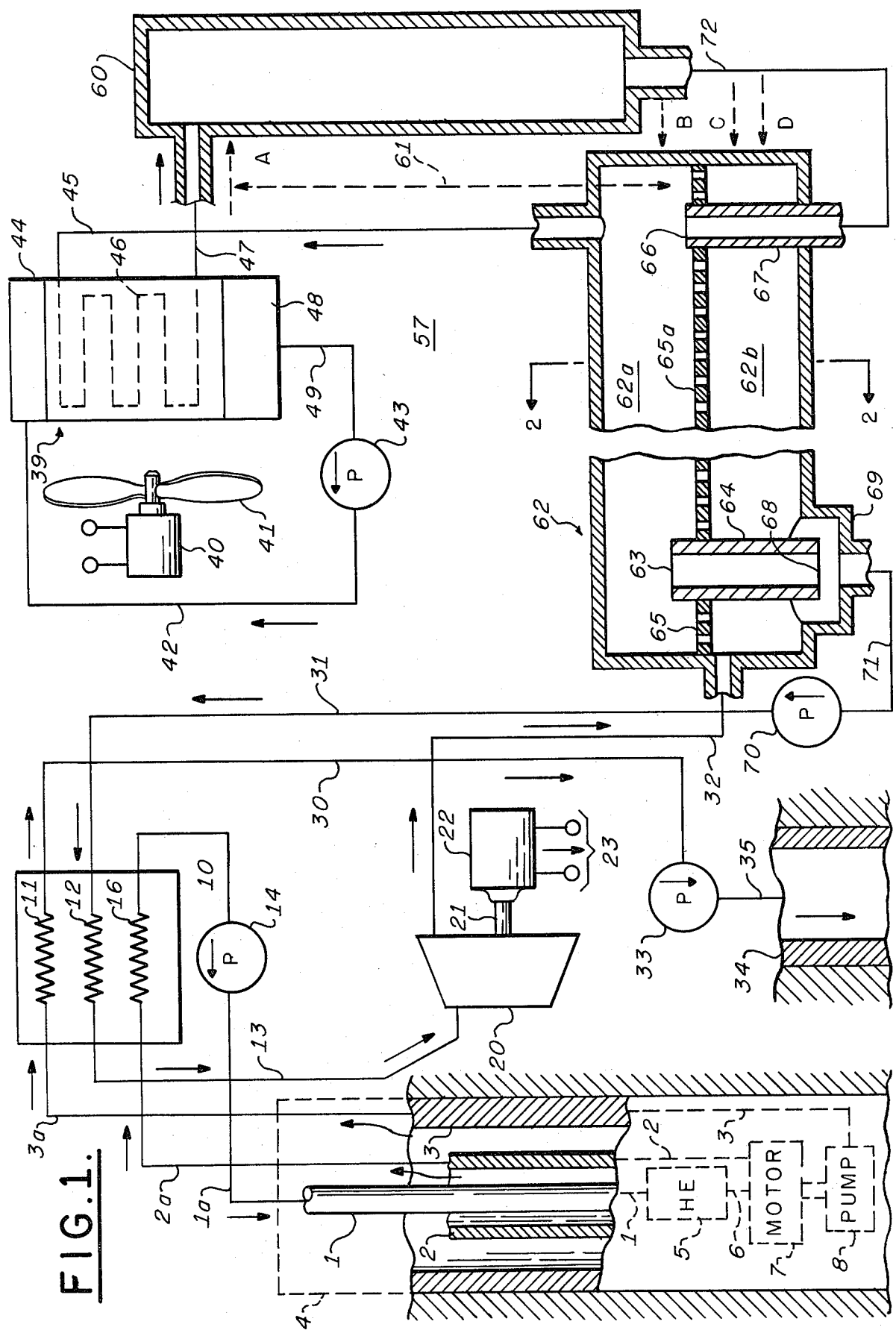
FIG. 1 is an elevation view, partly in cross-section, of the deep well geothermal energy conversion system and of cooperating surface-located control and power generation apparatus.

FIG. 1 illustrates an embodiment of the novel geothermal energy extraction system as being composed of three major sub-systems. The first or geothermal well sub-system extends from its well head 4 located adjacent the earth's surface for a distance far below that surface into an effective cavity or region where a copious supply of extremely hot water or brine under high pressure is naturally available. An active turbine motor 7 and a brine pump 8 are located adjacent the subterranean hot water reservoir within a conventional well casing 3 for operation in the manner generally described in the aforementioned Matthews U.S. Pat. Nos. 3,824,793 and 3,910,050 and elsewhere. In such prior systems, a working fluid is turned to vapor or super critical fluid in a heat exchanger 5 heated by the flow of hot brine past it in well casing 3. The vapor passes through conduit 6 to drive a turbine motor 7 which thereby drives brine pump 8. The exhausted vapor flows from turbine motor 7 via conduit 2 to the earth's surface, there to be condensed and returned in liquid form via conduit 1 to steam generator 5. While the apparatus of the present invention is illustrated in operation with a particular type of geothermal well pumping arrangement, it will be understood that it is equally useful with other kinds of energy extraction systems, including that of the aforementioned H. B. Matthews U.S. Pat. 4,142,108.

It will be apparent that the system of the Matthews U.S. Pat. No. 3,824,793, for example, may convey significant amounts of energy to the surface energy conversion means including heat exchanger 10 both through the exhaust vapor in conduit 2a and the brine flowing in the well casing extension 3a, the relative proportions being a matter of design choice. For example, the system of the Matthews U.S. Pat. No. 3,824,793 transfers much of its thermal energy to surface power conversion apparatus using the brine medium. On the other hand, in the Matthews U.S. Pat. No. 4,142,108, the extended down-well heat exchanger transfers the major part of the heat in the upward flowing brine into the descending supercritical working fluid, the brine being normally returned at the earth's surface directly into a reinjection well. A second subsystem of the present invention in the form of a brine reinjection well 34 also extends from a location at the earth's surface into deep earth strata which may be horizontally spaced through the aforementioned hot brine source for ultimate recycling through down-well pump 8.

Apparatus at the earth's surface forms a third subsystem and cooperates with the geothermal and reinjection well system according to the present invention, as is illustrated in FIG. 1. It will be understood that an objective of the invention is to generate large quantities of electrical power at terminals 23 at the earth's surface using a conventional fluid turbine 20 driving electrical power generator 22, both preferably located at ground level. For this purpose, hot brine is pumped to the earth's surface by geothermal well pump 8, being fed by casing 3 and its extension 3a to element 11 of a conventional boiler-heat exchanger device 10. Apparatus 10 is a conventional closed tank-like device designed to exchange heat between conventional heat exchanger elements 11 and 12 located therein. Elements 11 and 12 may take the forms of lineal or coiled pipes exchanging thermal energy by direct thermal conduction through their metal walls or through a suitable fluid disposed in the well known manner about them. The well pump 8 forces hot brine upward through the annular region between well casing 3 and conduits 2 and 3a and its thermal content is a significant source of heat for supply to the input element 11 of device 10. As in the aforementioned Matthews U.S. Pat. No. 3,910,050, the brine passing through element 11 also passes through conduit 30 after having been dropped in temperature within heat exchanger 10 and is then fed through pump 33, if needed, and conduit 35 into reinjection well 34. Thus, the dissolved mineral salts pumped to the surface in the hot brine in conduits 3 and 3a are returned harmlessly into the ground for reheating and recycling.

As is described in the aforementioned Matthews U.S. Pat. No. 3,910,050, other sources of geothermal energy may also be employed to add thermal energy to heat exchanger 10, such as the working fluid exhausted by conduit 2a from the deep well turbine motor 7 and flowing upward in the annulus between conduits 1 and 2. This exhaust fluid may be allowed to flow through conduit 2a into a heat exchanger element 16 also located within device 10 for forced flow by pump 14 after cooling or condensation, through conduits 1a and 1 back into the deep well heat exchanger or vapor generator 5 associated with well turbine motor 7, as described in the Matthews U.S. Pat. No. 3,910,050. The exhaust working fluid is thus used beneficially in this way to increase the operating efficiency of the present invention.

In any event, the condensed working fluid may be returned, for example, for re-use in the deep well apparatus, as is indicated in FIG. 1. The exhaust working vapor in conduit 2a passes through an input element 16 of heat exchanger 10. The condensed working fluid passes from element 16 through pump 14 into conduit 1a for re-use within geothermal well turbine 7. The working fluid may be pure water or another similar material. Liquid and vapor phases may be employed in the cycle or solely a supercritical liquid phase may be employed, as taught in the aforementioned Matthews U.S. Pat. No. 4,142,108.

The major elements for supply of heat into boiler-heat exchanger device 10 have been described. This heat is removed and used in a substantially conventional manner to operate the surface-located main power turbine 20. For this purpose, fluid which may be in the form of a conventional halocarbon organic material is supplied by feed pump 70 via conduit 31 to heat exchanger element 12 of heat exchange device 10. Flow of liquid in element 12 is counter to the direction of flow of heat in elements 11 and 16. The liquid in element 12 may thus evaporate, consequently generating high temperature, highly energetic vapor coupled via conduit 13 into the input stage of power turbine 20. After performing useful work therein by driving shaft 21 and generator 22, the power turbine exhaust is fed by pipe 32 into a novel condensing system 57 including a bubble tank 62. The condensed organic fluid exits tank 62 and is pumped through conduit 71 by pump 70 into conduit 31, the latter providing the input coupling to heat exchanger element 12. In this manner, the fluid for driving the main power turbine 20 is continuously recycled.

It will be understood that the apparatus, as thus far described, consists in one form of a deeply submerged super-heated steam generator 5 for driving a turbine motor 7 which, in turn, drives a hot brine pump 8. Clean working liquid, formed by condensing clean vapor on condenser 10, is supplied to be converted within vapor generator 5 into highly energetic vapor for driving the geothermal well turbine motor 7. The brine pump 8 serves to increase the pressure level of the hot brine so that it reaches the surface-located heat exchanger 10 still well above its saturation pressure and so that it may never, by flashing into steam, produce undesirable mineral deposition. According to the invention, a lower cost is achieved for the geothermal power extraction system and the efficiency of the apparatus for condensing the organic exhaust fluid from the main power turbine 20 is significantly increased.

According to the invention, a lower-cost, simplified geothermal energy extraction system is achieved by replacing certain heat exchanging elements of the prior art and by restoring enthalpy losses normally caused by pressure losses and sub-cooling in the condenser system. This is accomplished by passing the expanding primary power turbine exhaust vapor through the condensate liquid feeding the primary heat exchanger. The improvement is of particular interest where the geothermal brine source is copious but falls in a relatively low range of temperatures.

Figure 2:
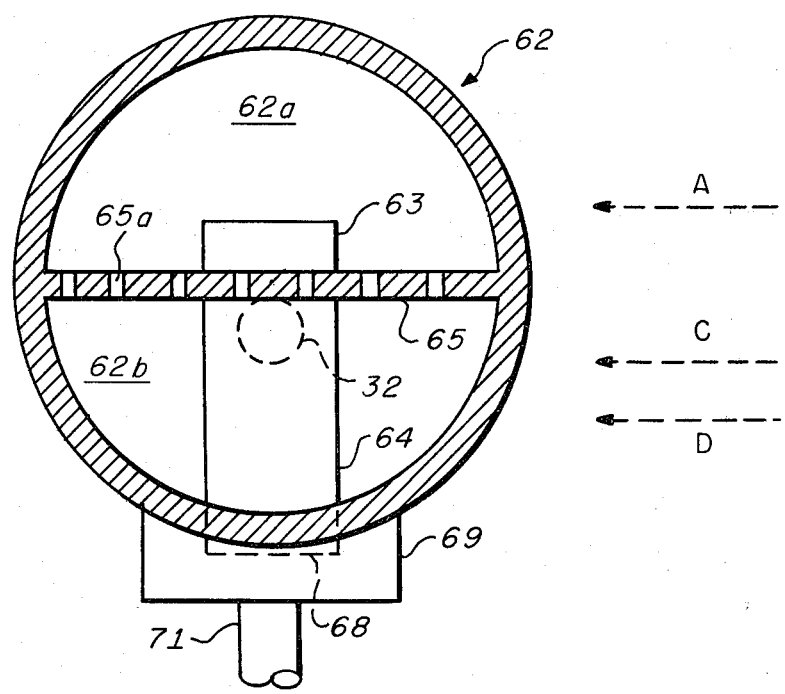
FIG. 2 is an elevation view, partly in cross section, of a bubble tank component also shown in FIG. 1.

For this purpose, the exhaust from power turbine 20 is coupled by conduit 32 into the lower section 62b of a horizontally disposed hollow closed cylindrical bubble tank 62 (FIGS. 1 and 2). The interior of bubble tank 62 is divided by horizontal diametrically disposed apertured divider 65 into upper and lower portions 62a and 62b. Liquid working fluid is thus stored in the lower portion 62b of bubble tank 62 at a level lying generally between limiting levels C and D and is therefore available in sump 69 for passage through conduit 71, motor driven pump 70, and conduit 31 into heat exchanger element 12 for use as has been described for driving power turbine 20. Divider or bubble tray 65 is provided with an array of bores such as bore 65a so that vapor present in lower portion 62b may find its way into bubble tank upper portion 62a. Liquid accumulating above divider 65, upon rising to a level B somewhat above the top 63 of stand-pipe 64, overflows to the bottom 68 of stand-pipe 64, adding to the fluid stored in the lower bubble tank portion 62b available to pump 70 as a working fluid for power turbine 20. Normal liquid flow is from the top 63 of stand-pipe 64 and out through conduit 71. If desired, the output conduit may be coupled directly to the bottom of the bubble tank 62 remote from stand-pipe 64, eliminating sump 69. Bubble tank 62 may be about five feet in diameter and 160 feet long. Entry pressure in conduit 32 may be about 30 p.s.i.a., with the pressure level within upper bubble tank portion 62a about 29.5 p.s.i.a.

Energetic vapor accumulates at the top of upper portion 62a of bubble tank 62 for withdrawal via conduit 45 and condensation in condenser 39. Condenser 39 and its immediately associated elements may be generally similar to the condenser system illustrated in FIG. 1 of the H. B. Matthews U.S. Pat. No. 4,059,959 for a "Geothermal Energy Processing System with Improved Heat Rejection," issued Nov. 20, 1977 and assigned to Sperry Corporation. It will also be understood by those skilled in the art that auxiliary controls of the general types illustrated in the Matthews U.S. Pat. No. 4,059,959 may be adapted for use in the condenser system of the present invention for liquid level control within wet tank 48.

In particular, the rising vapor in conduit 45 passes into the top element of a conventional multiple series element on multiple turn condenser 46 at a pressure, for example, of 29.5 p.s.i.a., exhausting as condensate via conduit 47, at a pressure, for example of 24.5 p.s.i.a., into the top of a cylindrical vertical barometric seal tank 60, filling it with condensate to level A. Tank 60 may be about two feet in diameter, with the fluid level A, for example, about eight feet above the fluid level B in bubble tank 62. The liquid level A is established by the pressure drop in condenser 46 yet to be described and the working fluid liquid density. Barometric tank 60 maintains a barometric seal between conduits 47 and 72 and controls the high liquid level of liquid stored in the barometric tank. In essence, it maintains a seal between the pressure within conduit 47 and the pressure level within the upper part 62a of bubble tank 62 by maintaining approximately a 5 p.s.i.a. head of condensate in conduit 47. At the top of the condenser system 39 is disposed a generally conventional cooling fluid distribution manifold 44 provide with multiple orifices for spraying cooling fluid drops downward over coils 46. Remaining cooling fluid falls into collector manifold or wet well 48, wherein it flows through conduit 49, pump 43, and conduit 42 back into the upper distribution manifold 44 for continuous recirculation. It is seen that the falling coolant, which may be water, is readily broken up into droplet form by evaporation from the surfaces of the water drops. Such desirable evaporation may be enhanced by rapidly moving air through the droplet cascade as generally indicated by fan 41 driven by motor 40 so that a substantial volume of rapidly moving air passes through the droplet shower. In turn, the droplets cool the conduits 46 of condenser system 39 and, consequently the working fluid flowing through them. As noted, the condensed working fluid stored within barometric tank 60 below level A is available for flow through conduit 72 into a second stand-pipe 67 within the upper portion 62a of bubble tank 62. Overflow from stand-pipe 67 is thus available within portion 62a for heat exchange with the liquid therein and the rising bubbles and for eventual overflow in stand-pipe 64 into sump 69.

Figure 3:
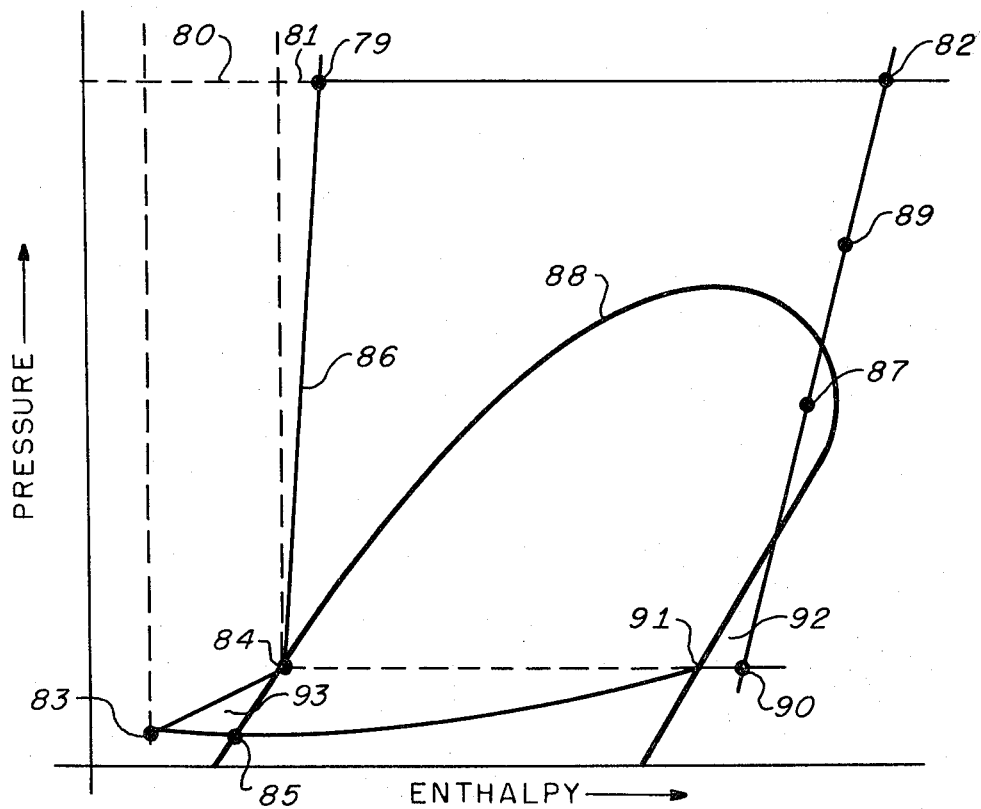
FIG. 3 is a graph useful in explaining the operation of the invention.

Operation of the invention will be further understood from the pressure versus enthalpy diagram of FIG. 3. The pressure enthalpy diagram illustrated therein includes a curve 86 associated with a conventional Rankine cycle type of geothermal system and a dome or dual phase boundary curve 88 associated with the working fluid of the system. The working fluid of the apparatus of FIG. 1 flows in two separate closed loop paths. The first closed loop path is defined by the flow of working fluid through the down well pumping system enclosed in the well casing 3, the heat exchanger element 16, and the pump 14. The second closed loop path is defined by the flow of working fluid through the condensing system 57, the pump 70, the heat exchanger element 12, and the turbine 20. As the working fluid flows through the first closed loop path, the feed pump 14 adds pressure to the working fluid and some heat is transferred to the working fluid in conduit 1 as it flows past the rising brine. This increase in pressure and enthalpy is represented by the line between points 84 and 79 on curve 86. The increase in enthalpy between points 79 and 82 on curve 86 is attributable to the heat transfer relationship that exists between the hot brine in heat exchanger element 11 and the working fluid in heat exchanger element 12 of the second closed loop path. Point 82, therefore, represents the point of maximum pressure and maximum enthalpy in the entire system. The decrease in pressure and enthalpy between points 82 and 89 is attributable to the work performed in pumping brine. The decrease in pressure and enthalpy between point 89 and point 87, which may be located within the dome defined by curve 88, is attributable to work performed in lifting the working fluid to the earth's surface.

The decrease in pressure and enthalpy between points 87 and 90 is attributable to the expansion of working fluid in the main turbine 20 and the work resulting therefrom. The points 90, 91 and curve 88 define a superheat region 92, and the working fluid is desuperheated from this state within the bubble tank apparatus 62 of the present invention as hereinafter described. The condensing process is represented by the gently sloping line which is defined by the points 90, 91, 85, 83 and which also represents a loss of pressure on the order of 5 p.s.i.a. It should be noted that the gentle slope of line 90–83 has been exaggerated for the purposes of illustration. The points 84, 83, 85 and curve 88 define a sub-cool region 93. The sub-cooling within the system is the result of the cooling fluid within condenser 39 cooling a portion of the condensate working fluid to a temperature below its condensing temperature.

The existence, therefore, of both a superheat region 92 and a sub-cool region 93 for the working fluid can be utilized to particular advantage by the apparatus of the present invention. The expanded exhaust of the turbine 20, as explained above, includes substantial amounts of superheat, and this superheat can be used to restore enthalpy to the system. The sub-cooled condensate, as also explained above, is disposed upon the bubble tray 65 and effectively removes superheat from the vaporized exhaust when the vaporized exhaust is bubbled through the condensate. It should be noted, however, that if insufficient superheat is available for the 83 to 84 path, incoming vapor is condensed above the bubble tray 65 giving up latent heat for the 83 to 84 path. If too much superheat is available, liquid above the bubble tray 65 is vaporized and then condensed in the condenser 39. In any case, an amount of heat equal to 90 to 84 must be rejected to the atmosphere, and an amount of heat represented by 83 to 84 is saved by the system. The desuperheated vaporized exhaust is then conducted to the condenser 39, via conduit 45, where it suffers a flow loss and where it is condensed and sub-cooled. The newly sub-cooled condensate is conducted out of the condenser 39 to the barometric leg 60, which restores pressure to the sub-cooled condensate. The sub-cooled condensate flows out of the barometric leg 60 and is deposited in a layer on bubble tray 65. Superheated expanded exhaust entering the bubble tank 62 is then bubbled through the sub-cooled condensate, thereby reheating the sub-cooled condensate and restoring enthalpy to the system in a continuous closed loop manner. This process of restoring enthalpy is represented by the line between point 83 and point 84 on the curve 86 of the pressure enthalpy diagram. It should be noted that point 84 is substantially horizontal to point 91, and that dotted lines 80, 81 indicate the amount of restored enthalpy. This restored enthalpy for all practical purposes would be lost without the apparatus of the present invention. If this enthalpy were not regained from the superheated vapor, then the same amount of enthalpy would have to be extracted from the hot geothermal brine. The apparatus of the present invention, therefore, utilizes otherwise wasted heat in the turbine exhaust to help provide an efficient geothermal energy conversion system for a low temperature geothermal source that might otherwise be commercially non-exploitable.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An improved Rankine cycle machine of the type having a turbine-motor means driven by a working fluid and having a condenser for sub-cooling the working fluid, wherein the improvement comprises
   means for restoring enthalpy derived from superheated exhaust vapor from said turbine-motor to said sub-cooled working fluid, further comprising:
   (a) coupling means for supplying said working fluid in said superheated expanded exhaust form from said turbine-motor means to working fluid transfer means,
   (b) said transfer means further providing direct-contact nonturbulent flow means for passively transferring superheat and latent heat from said expanded exhaust to said sub-cooled working fluid,
   (c) means for condensing said working fluid from desuperheated vapor form in a pressurized environment to create said sub-cooled working fluid in liquid form, said condensing means having a coolant supply operating in an ambient pressure environment independent of and isolated from said working fluid, and
   (d) coupling means for receiving said sub-cooled working fluid from said condensing means and for supplying said sub-cooled working fluid to said transfer means, while restoring a pressure head to said sub-cooled working fluid.

2. Geothermal deep well energy extraction apparatus of the kind in which solute-bearing water is pumped to a first station at the earth's surface from a subterranean second station by transferring thermal energy from said solute-bearing water to a working fluid for driving primary turbine-motor means and primary electrical generator means at said first station, said solute-bearing water being returned from said first station into reinjection well means, said extraction means additionally including
   means for restoring enthalpy derived from superheated exhaust vapor from said turbine-motor to said working fluid in sub-cooled form, comprising:
   (a) coupling means for supplying said working fluid in said superheated expanded exhaust form from said turbine-motor means to working fluid transfer means,
   (b) said transfer means further providing direct contact non-turbulent flow means for passively transferring superheat and latent heat from said expanded exhaust to said sub-cooled working fluid,
   (c) means for condensing said working fluid from desuperheated vapor form in a pressurized environment to create said sub-cooled working fluid in liquid form, said condensing means having a coolant supply operating in an ambient pressure environment independent of and isolated from said working fluid, and
   (d) coupling means for receiving said sub-cooled working fluid from said condensing means and for supplying said sub-cooled working fluid to said transfer means, while restoring a pressure head to said sub-cooled working fluid.

3. An apparatus according to claims 1 or 2 wherein said transfer means further comprises:
   (a) a tank,
   (b) an apertured divider means for dividing said tank into first and second portions and for passively bubbling the superheated vapor through sub-cooled working fluid disposed thereon,
   (c) a first conduit disposed between the first and second portions of said tank,
   (d) a second conduit disposed between a portion of said tank and said coupling means for receiving the sub-cooled working fluid,
   (e) first outlet means for conducting desuperheated vapor to said condensing means, and (f) second outlet means for conducting condensed working fluid from said transfer means.

4. An apparatus according to claim 3 wherein said coupling means for receiving sub-cooled working fluid includes a barometric seal tank, for storing the sub-cooled working fluid and for restoring pressure thereto, and outlet means coupled to said second conduit means of said transfer means.

5. An apparatus according to claim 4 wherein said coupling means for supplying superheated expanded working fluid includes inlet means to a portion of said tank of said transfer means.

6. An apparatus according to claim 5 wherein said second outlet means of said transfer means includes a pump and conduit means coupled thereto.

7. An apparatus according to claim 6 wherein said first outlet means of said transfer means further includes conduit means for coupling a portion of said tank to said condensing means.

8. An apparatus according to claim 7 wherein said condensing means includes fan means for moving air and droplets of cooling fluid over cooling coils.

9. An apparatus according to claim 2 further including a boiler having:
(a) a first heat exchanger element having hot solute-bearing water pass therethrough for reinjections into the well,
(b) a second heat exchanger element disposed in heat transfer relationship to said first heat exchanger for extracting thermal energy from a first working fluid which energizes a pump for pumping the solute bearing water, and
(c) a third heat exchanger element disposed in heat transfer relationship with said first and second heat exchange elements for providing thermal energy to a second working fluid which energizes said primary turbine-motor means and said primary electrical generator means.

* * * * *

UNITED STATES PATENT AND TRADEMARK OFFICE
CERTIFICATE OF CORRECTION

PATENT NO. : 4,380,903
DATED : April 26, 1983
INVENTOR(S) : Hugh B. Matthews

It is certified that error appears in the above-identified patent and that said Letters Patent is hereby corrected as shown below:

At column 1, following the title and preceding "Background of the Invention" insert the following:

— GOVERNMENT'S RIGHTS

The Government has rights in this invention pursuant to Contract No. DE-AC03-79ET27131, awarded by the U.S. Department of Energy. —

Signed and Sealed this

First Day of May 1984

[SEAL]

Attest:

GERALD J. MOSSINGHOFF

Attesting Officer

Commissioner of Patents and Trademarks